US009782932B2

(12) United States Patent
Roels et al.

(10) Patent No.: US 9,782,932 B2
(45) Date of Patent: Oct. 10, 2017

(54) METHOD FOR MANUFACTURING OBJECTS BY SELECTIVE SINTERING

(71) Applicants: MATERIALISE N.V., Leuven (BE); KATHOLIEKE UNIVERSITEIT LEUVEN, Leuven (BE)

(72) Inventors: Toon Roels, Oud-Heverlee (BE); Bart Goderis, Bierbeek (BE)

(73) Assignee: Materialise, NV, Leuven (BE)

( * ) Notice: Subject to any disclaimer, the term of this patent is extended or adjusted under 35 U.S.C. 154(b) by 69 days.

(21) Appl. No.: 14/745,037

(22) Filed: Jun. 19, 2015

(65) Prior Publication Data

US 2015/0367575 A1    Dec. 24, 2015

Related U.S. Application Data

(63) Continuation of application No. PCT/EP2013/077553, filed on Dec. 20, 2013.

(30) Foreign Application Priority Data

Dec. 21, 2012  (EP) .................................... 12198838

(51) Int. Cl.
*B29C 67/04*  (2017.01)
*B29C 67/00*  (2017.01)
*C08J 5/00*  (2006.01)
*C08F 110/14*  (2006.01)
*C08F 112/08*  (2006.01)
*C08F 112/12*  (2006.01)
*B33Y 10/00*  (2015.01)
*B33Y 70/00*  (2015.01)
*B33Y 80/00*  (2015.01)

(52) U.S. Cl.
CPC ........ *B29C 67/0077* (2013.01); *C08F 110/14* (2013.01); *C08F 112/08* (2013.01); *C08J 5/00* (2013.01); *B33Y 10/00* (2014.12); *B33Y 70/00* (2014.12); *B33Y 80/00* (2014.12)

(58) Field of Classification Search
CPC ... B29C 67/0077; C08F 110/14; C08F 112/08
USPC .................................................. 264/113, 497
See application file for complete search history.

(56) References Cited

U.S. PATENT DOCUMENTS 6,136,948 A * 10/2000 Dickens, Jr. .......... B29C 41/003
156/62.2
6,342,573 B1 * 1/2002 Antonio ................ B29C 43/006
264/125
7,261,542 B2 * 8/2007 Hickerson ........... B29C 67/0085
264/308

OTHER PUBLICATIONS

Search Report for International Application No. PCT/EP2013/077553, dated Apr. 4, 2014 (2 pages).*

* cited by examiner

*Primary Examiner* — Fred M Teskin

(57) ABSTRACT

The application relates to methods for manufacturing an object from a powder by selective sintering. More particularly, the methods described herein involve the step of selecting a polymer wherein the density of the crystalline phase of said polymer is equal to or lower than the density of the amorphous phase of said polymer.

15 Claims, No Drawings

METHOD FOR MANUFACTURING OBJECTS BY SELECTIVE SINTERING

CROSS-REFERENCE TO RELATED APPLICATION

This application is a continuation under 35 U.S.C. §120 of International Application No. PCT/EP2013/077553, filed Dec. 20, 2013 (published by the International Bureau as International Publication No. WO/2014/096294 on Jun. 26, 2014), which claims priority to European Patent Application No. 12198838.0, filed Dec. 21, 2012. The entire contents of the above-referenced patent applications are hereby incorporated by reference.

FIELD OF THE INVENTION

Described herein are methods for manufacturing an object from a powder by selective sintering and objects manufactured using such methods.

BACKGROUND OF THE INVENTION

Selective sintering is an additive manufacturing or 3D printing technique that typically uses electromagnetic radiation to fuse powders comprising polymers, metals, ceramics, or glass into a mass that has a desired three-dimensional shape. Typically selective sintering techniques start from a digital representation of the 3D object to be formed. Generally, the digital representation is sliced into a series of cross-sectional layers which can be overlaid to form the object as a whole. The selective sintering apparatus uses this data for building the object on a layer-by-layer basis. For example, a laser may selectively fuse powdered material by scanning cross-sections generated from a 3D digital description of an object (for example from a CAD file or scan data) on the surface of a powder bed. Typically, after each cross-section is scanned, the powder bed is lowered by one layer thickness, a new layer of material is applied on top, and the process is repeated until the object is completed. The bulk powder material in the powder bed may be heated to slightly below its melting point, to make it easier for the laser to raise the temperature of the selected regions the rest of the way to the melting point.

Selective sintering can produce parts from a relatively wide range of commercially available powder materials, such as polymers, metals, and composites. Although amorphous and semi-crystalline polymers are both being used in selective sintering, semi-crystalline polymers are preferred because the melting of semi-crystalline polymers typically takes place in a relatively narrow temperature range. This makes it possible to heat the powder bed to a temperature close to the melt temperature, without the risk of unwanted sintering of the powder particles. The energy gap to be bridged with the laser energy is hence minimal, and easier to control. Accordingly, semi-crystalline polymers such as polyamide 12 generally offer a better dimensional accuracy and reproducibility in selective sintering than amorphous polymers such as polycarbonate and polystyrene.

A further parameter which is considered particularly relevant to the accuracy and reproducibility of selective sintering is the undercooling required or afforded by the polymer to recrystallize from the molten state. This is typically represented by $\Delta T$, and may be measured by calorimetry experiments such as DSC. $\Delta T$ can be defined as the difference in melting temperature and the crystallization temperature. It is generally accepted that that an increased $\Delta T$ results in reduced deformation and curling upon sintering, and therefore is desirable for robust sintering. In view of the above, conventionally there are two main options to reduce problems due to curling and distortion in selective sintering of polymer powders:
  a) selecting a polymer with a large $\Delta T$, for example polyamide 12; and/or
  b) optimizing the powder bed temperature.

However, for many applications there is a need of further improvement of selected sintering.

SUMMARY OF THE INVENTION

Described herein are methods for manufacturing an object from a powder by selective sintering, and objects manufactured by said methods for manufacturing. More particularly, the present application discloses the use of semi-crystalline polymers, wherein the density of the crystalline phase of said polymer(s) is equal to or lower than the density of the amorphous phase of said polymer(s), in the manufacture of a 3D object by means of selective sintering.

Accordingly, provided herein are methods for manufacturing an object by selective sintering of a powder, which methods comprise:
  i) selecting at least one semi-crystalline polymer, wherein the density of the crystalline phase of said polymer is equal to or lower than the density of the amorphous phase of said polymer upon crystallization; and
  ii) manufacturing said object from a powder by selective sintering, wherein said powder comprises said semi-crystalline polymer selected in step i).

In particular embodiments, the change in density upon crystallization of said at least one semi-crystalline polymer compensates at least part of the change in specific volume or density of said polymer(s) upon cooling.

In certain embodiments, step i) of the method comprises:
  ia) identifying the change in specific volume or density of one or more polymers upon crystallization; and
  ib) selecting at least one semi-crystalline polymer based on the information obtained in step ia), wherein the density of the crystalline phase of said at least one polymer is equal to or lower than the density of the amorphous phase of said polymer upon crystallization.

In particular embodiments, said powder is a composite powder.

Further provided herein are three-dimensional objects obtainable or obtained by selective sintering of a powder, wherein said object comprises at least 30 w % of a semi-crystalline polymer wherein the density of the crystalline phase is lower than the density of the amorphous phase.

Further provided herein is the use of a powder in the manufacture of a 3D object by means of selective sintering of said powder, wherein said powder comprises at least 30 w % of a semi-crystalline polymer, wherein the density of the crystalline phase is lower than the density of the amorphous phase.

Further provided herein are methods for manufacturing an object by selective sintering of a powder, characterized in that said powder comprises a semi-crystalline polymer wherein the density of the crystalline phase is lower than the density of the amorphous phase.

In particular embodiments of the methods, object and use provided herein, said semi-crystalline polymer is selected from the list consisting of syndiotactic polystyrene (sPS), poly(4-methyl-1-pentene) (P4MP), and syndiotactic poly(p-methylstyrene).

In certain embodiments of the methods, object and use provided herein, said powder comprises at least 30 w % (percent by weight) of said semi-crystalline polymer, preferably at least 50 w % of said semi-crystalline polymer.

In certain embodiments of the methods, object and use provided herein, the degree of crystallinity of said semi-crystalline polymer is between 50 and 80%.

In particular embodiments, the methods described herein may provide a broad process window compared to selective sintering methods using conventional polymers such as polyamide 12. In particular, the methods described herein may allow for relatively low processing temperatures (i.e. powder bed temperature), which can reduce the thermal breakdown of the polymer, and may ensure good recyclability of the obtained objects.

The above and other characteristics, features and advantages of the present methods will become apparent from the following detailed description, which illustrates, by way of example, the principles of the disclosed methods.

DETAILED DESCRIPTION OF THE INVENTION

While potentially serving as a guide for understanding, any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited components, elements or method steps also include embodiments which "consist of" said recited components, elements or method steps.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments described herein are capable of operation in other sequences than described or illustrated herein.

The values as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to ensure one or more of the technical effects envisaged herein. It is to be understood that each value as used herein is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the concepts described herein, including technical and scientific terms, have the meaning as commonly understood by one of ordinary skill in the art. By means of further guidance, definitions for the terms used in the description are included to better appreciate the teaching of the present disclosure.

The terms or definitions used herein are provided solely to aid in the understanding of the teachings provided herein.

As used herein, the term "selective sintering" relates to an additive manufacturing process wherein a three-dimensional (3D) object is fabricated a layer (lamina) at a time, by depositing a first layer of powder over an entire manufacturing area, stimulating the sections of the manufacturing area that are part of the 3D object to be constructed, thereby causing the powder on the stimulated areas to sinter (fuse) and form a lamina.

Upon completion of this lamina a new layer of powder is deposited and the process is repeated until the object is completely finished.

The term "polymer" as used herein refers to compounds comprising at least ten repeating units, preferably at least 20 repeating units.

The term "semi-crystalline polymer" as used herein refers to a polymer whose segments are partially crystallized at room temperature, or in general at temperatures below the crystallization temperature of the material. The term "crystallized" when referring to polymers relates to a process associated with partial alignment of the polymer's molecular chains. These chains fold together and form ordered regions called lamellae, which typically compose larger spheroidal structures named spherulites. Polymers generally do not fully crystallize upon cooling from the melt because of the entangled nature of polymers, and may therefore comprise crystalline regions separated by amorphous regions. The term "semi-crystalline polymer" as used herein includes polymers with a degree of crystallinity of at least 5%. The term "amorphous" as used herein refers to a degree of crystallinity of less than 5%.

As used herein, the term "degree of crystallinity" refers to the degree of crystallinity as measured by DSC. DSC provides a rapid method for determining polymer crystallinity based on the heat required to melt the polymer. The use of DSC to determine polymer crystallinity is known in the art (see e.g. B Wunderlich, Thermal Analysis, Academic Press, 1990, pp. 417-431). Alternatively, the degree of crystallinity can be determined using other analysis methods, such as (wide angle) x-ray diffraction and Nuclear Magnetic Resonance (NMR) (see e.g. S Kavesh and J M Schultz, Meaning and Measurement of Crystallinity in Polymers: A Review, *Polymer Engineering and Science* 1969, 69, 452-460).

The term "polymorphous polymer" as used herein refers to a polymer exhibiting polymorphism. Polymorphism can be characterized as the ability of a particular compound to crystallize in different crystal modifications whilst maintaining the same chemical formula. Accordingly, a polymorphous polymer may exist in more than one crystal structure. Polymorphs of a given polymer are chemically identical in containing the same atoms bonded to one another in the same way, but differ in their crystal modifications, which may affect one or more physical properties such as crystallization temperature, bulk density, stability, flow properties, etc.

The term "density" as used herein refers to the mass density of a material, and is defined as its mass per unit volume. It is expressed in units of kilogram per cubic meter ($kg/m^3$) and is often represented by the symbol $\rho$ (lower case Greek letter rho). The term "specific volume" as used herein refers to the specific volume of a material, and is the reciprocal of the density. Accordingly, the specific volume is defined as the material's volume per unit of mass, and is expressed in units of cubic meter per kilogram ($m^3/kg$). The specific volume is often represented by the symbol $\nu$ (lower case Greek letter nu). The density of a polymer powder may be measured via the immersion method (solid polymers), liquid pyknometer method (polymer powders), or titration method (solid polymers) for example according to the ISO 1183-1:2012 standard. Additionally or alternatively, the density of a polymer may be measured via dilatometry and/or thermomechanical analysis (TMA).

The term "melting temperature" or "melting point" as used herein generally refers to the temperature at which no crystallinity can be detected by wide angle x-ray diffraction. Alternatively, the melting point may be determined via DSC, for example according to the ISO 11357-3:2011 standard. The melting temperature is hereinafter also represented by the symbol "$T_m$".

The term "glass transition temperature" as used herein refers to the temperature at which an amorphous polymer or amorphous regions of a polymer is or are transformed, in a reversible way, from a viscous or rubbery condition to a hard and relatively brittle one. The glass transition temperature may be determined via DSC, for example according to the ISO 11357-2:1999 standard. The glass transition temperature is hereinafter also represented by the symbol "$T_g$".

The temperature at which a polymer crystallizes will typically be between its melting temperature and the glass transition temperature minus 50° C. The densities and temperatures herein preferably refer to densities and temperatures at a pressure of about 1 bar, for example at atmospheric pressure. It should be understood, however, that any semi-crystalline polymer, wherein the density of the crystalline phase of said polymer is equal to or lower than the density of the amorphous phase of said polymer (regardless of pressure), is envisioned by the current methods describe herein.

The term "tacticity" as used herein refers to the spatial arrangement of pendant groups in a polymer. For example, a polymer is "atactic" when its pendant groups are arranged in a random fashion on both sides of a hypothetical plane through the polymer backbone (i.e. the main chain of the polymer). In contrast, a polymer is "isotactic" when its pendant groups are arranged on the same side of the chain and "syndiotactic" when its pendant groups alternate on opposite sides of the chain. Accordingly, the term "syndiotactic" as used herein refers to polymers wherein the pendant groups alternate on opposite sides of a hypothetical plane through the polymer backbone. In other words, syndiotactic polymers comprise a stereo regular structure, more particularly, wherein the corresponding chiral centers of adjacent monomers within that polymer have alternating stereogenic configurations. For example, in syndiotactic polystyrene, the phenyl substituents alternate regularly above and below the plane of the polymer backbone. As used herein, the term "syndiotactic polymer" includes polymers includes polystyrene in which syndiotactic stereoregularity predominates, more particularly polymers having a stereoregular structure of greater than 50% syndiotacticity as determined by $^{13}C$ NMR in terms of a racemic diad.

Reference throughout this specification to "one embodiment" or "an embodiment" means that a particular feature, structure or characteristic described in connection with the embodiment is included in at least one embodiment envisaged herein. Thus, appearances of the phrases "in one embodiment" or "in an embodiment" in various places throughout this specification are not necessarily all referring to the same embodiment, but may do so.

Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are also envisaged herein, and may form different embodiments, as would be understood by those in the art. For example, in the appended claims, any of the features of the claimed embodiments can be used in any combination.

Described herein are methods for manufacturing an object from a powder by selective sintering, wherein the powder comprises a semi-crystalline polymer. Although the methods are described herein with respect to the manufacture of a 3D object by means of selective sintering, these methods may, mutatis mutandis, also be used for the manufacture of a 3D object by means of fused deposition modeling. Fused deposition modeling and related techniques make use of a temporary transition from a solid material to a liquid state, usually due to heating. The material is driven through an extrusion nozzle in a controlled way and deposited in the required place as described among others in U.S. Pat. No. 5,141,680.

As described above, conventionally the two main options to reduce problems due to curling and distortion in selective sintering of polymer powders are:
a) selecting a polymer with a large $\Delta T$, for example polyamide 12; and/or
b) optimizing the powder bed temperature.

The methods described herein are based on the finding that there is a further option to reduce curling and distortion, more particularly the use of semi-crystalline polymers wherein the change in specific volume or density upon crystallization of said polymer is minimized. Particularly envisaged are polymers wherein the density of the crystalline phase is equal to or lower than the density of the amorphous phase. This is in contrast with conventional methods using e.g. polyamide 12, wherein the density of the crystalline phase is higher than the density of the amorphous phase.

The density of a semi-crystalline polymer can be derived from the degree of crystallinity and the density of the crystalline and amorphous phases via:

$$\rho_p(T) = x_c(T) \cdot \rho_c(T) + x_a(T) \cdot \rho_a(T)$$

Herein $x_c$ and $x_a$ are the crystalline and amorphous fraction, respectively, at temperature T. $x_c$ and $x_a$ are dimensionless numbers ranging from 0 to 1, wherein the sum of $x_c$ and $x_a$ is equal to 1. $\rho_p(T)$, $\rho_c(T)$, and $\rho_a(T)$ are the density of the semi-crystalline polymer, the density of the crystalline fraction, and the density of the amorphous fraction, respectively, at temperature T.

The relation between the density $\rho$ of a given material and the temperature T can be expressed as:

$$\rho(T) = \rho(T_0)/(1 + \alpha \Delta T)$$

wherein $\Delta T = T - T_0$, and wherein $\alpha$ is the thermal expansion coefficient (expressed in units of 1/T). $\alpha$ typically is temperature-dependent itself, but may be considered constant over small temperature intervals. In a given semi-crystalline polymer, the thermal expansion coefficient of the crystalline phase may be different from the thermal expansion coefficient of the amorphous phase.

Typically, the density of a polymer increases as the temperature decreases. This phenomenon is also known as "thermal contraction", and can lead to curling and deformation of objects obtained by selective sintering of polymer powders.

In the (relatively slow) process of polymer crystallization, the crystalline fraction $x_c$ increases. Consequently, the change in density of the semi-crystalline polymer upon cooling depends on the absolute difference between the density of the crystalline phase and the density of the amorphous phase, and on the thermal expansion coefficient a of both the crystalline and amorphous fraction.

It has been found that in some polymers, more particularly in polymers wherein the density of the crystalline phase is equal to or lower than the density of the amorphous phase at crystallization, minimizing this change in density upon crystallization reduces curling and deformation in selective sintering processes. Indeed, unlike polymers such as polyamide 12, polymers of which the density of the amorphous phase is equal to the density of the crystalline phase do not exhibit a sudden or discontinuous change in density upon crystallization. Additionally, any change in density during crystallization (e.g. expansion) can at least partially compensate for any change in density (contraction) upon cooling.

Accordingly, described herein are methods for manufacturing an object from a powder by selective sintering, characterized in that said powder comprises a semi-crystalline polymer wherein the density of the crystalline phase of said polymer is equal to or lower than the density of the amorphous phase of said polymer. More particularly, described herein is a method for manufacturing an object by selective sintering of a powder, said method comprising:

i) selecting at least one semi-crystalline polymer, wherein the density of the crystalline phase of said polymer is equal to or lower than the density of the amorphous phase of said polymer upon crystallization; and ii) manufacturing said object from a powder by selective sintering, wherein said powder comprises said one or more semi-crystalline polymers selected in step i).

This will be explained more in detail herein below.

In step i) of the method described herein, at least one or semi-crystalline polymer is selected, hereinafter also referred to as "the semi-crystalline polymer" or "the polymer". Although the polymer is referred to using a singular noun, it is envisaged that in particular embodiments, two or more semi-crystalline polymers are selected, having one or more of the characteristics as described herein. The degree of crystallinity of the semi-crystalline polymer is at least 5%. In certain embodiments, the degree of crystallinity of the semi-crystalline polymer is higher than 10%. In particular embodiments, the degree of crystallinity of the semi-crystalline polymer ranges between 20 and 90%. In particular embodiments, the degree of crystallinity ranges between 40 and 80%. In further embodiments, the degree of crystallinity ranges between 50 and 80%.

The semi-crystalline polymer selected in step i) is characterized in that the density of the crystalline phase of the polymer is equal to or lower than the density of the amorphous phase of the polymer upon crystallization. In other words, the specific volume (i.e. the ratio of the polymer volume to its mass) of the crystalline phase of the polymer is equal to or higher than the specific volume of its amorphous phase.

This requirement is considered met if there is at least one temperature at which the density of the crystalline phase of the polymer is equal to or lower than the density of the amorphous phase of the polymer upon crystallization. Preferably, this temperature is a temperature at which a transition from the amorphous phase to the crystalline phase can occur. The temperature at which such transition can occur may depend on various parameters, but will typically range between $T_g$-50° C. and $T_m$.

Accordingly, in particular embodiments, the density of the crystalline phase of the polymer is equal to or lower than the density of the amorphous phase of the polymer upon crystallization, at one or more temperatures between $T_g$-50° C. and $T_m$, preferably at one or more temperatures between $T_g$ and $T_m$.

The methods envisaged herein in particular embodiments encompass identifying or determining the change in density of one or more polymers upon crystallization. One or more semi-crystalline polymers may then be selected wherein the density of the crystalline phase of said polymer is equal to or lower than the density of the amorphous phase of said polymer upon crystallization. Accordingly, in particular embodiments, step i) of the methods described herein may comprise:

ia) identifying the change in specific volume or density of one or more polymers upon crystallization; and ib) selecting a semi-crystalline polymer based on the information obtained in step ia), wherein the density of the crystalline phase of said polymer is equal to or lower than the density of the amorphous phase of said polymer upon crystallization.

In certain embodiments, the methods described herein may further comprise identifying or determining the change in specific volume or density of said one or more polymers upon cooling from melting point to a temperature of interest and determining to what extent the change in specific volume or density upon crystallization of said polymer compensates the change in specific volume or density of said polymer upon cooling. In particular embodiments, the temperature of interest is room temperature, e.g. about 20 to 25° C. One or more semi-crystalline polymers may then be selected based on whether the change in density upon crystallization of the selected semi-crystalline polymer compensates at least part of the change in density of said semi-crystalline polymer upon cooling. Accordingly, in particular embodiments, step i) of the methods described herein may comprise:

iA) identifying the change in specific volume or density of one or more polymers upon crystallization, and identifying the change in specific volume or density of said one or more polymers upon cooling from melting point to a temperature of interest; and iB) selecting a semi-crystalline polymer based on the information obtained in steps i) and ii), wherein the density of the crystalline phase of said polymer is lower than the density of the amorphous phase of said polymer upon crystallization; wherein the change in specific volume or density upon crystallization of said polymer compensates at least part of the change in specific volume or density of said polymer upon cooling.

In particular embodiments, the polymer is selected in step iB) if the change in density upon crystallization compensates at least 5%, more preferably at least 10%, at least 15%, at least 20%, at least 25% or at least 30% of the change in density upon cooling. Thus in particular embodiments, the invention provides methods of for manufacturing an object by selective sintering of a powder, wherein the powder comprises a semi-crystalline polymer which is characterized in that the change in density upon crystallization compensates at least 5%, at least 10%, at least 15%, at least 20%, at least 25%, or at least 30% of the change in density upon cooling.

Step ia) or iA) may comprise obtaining the relevant specific volumes or densities from one or more databases, and/or may comprise actual measurement of the (change in) specific volume. The (change in) specific volume may be measured via dilatometry and/or TMA. These measurements may be combined with methods for determining the degree of crystallinity of the polymer, such as wide angle x-ray diffraction.

Suitable semi-crystalline polymers may include polymorphous polymers, wherein the density of the crystalline phase of the semi-crystalline polymer in at least one possible crystal structure is equal to or lower than the density of its amorphous phase. In particular embodiments, the density of the crystalline phase of the semi-crystalline polymer in all possible crystal structures is equal to or lower than the density of its amorphous phase. However, it is also envisaged that in particular embodiments, the semi-crystalline polymer is not a polymorphous polymer.

Polymers which are considered particularly suitable for use in the method described herein include, but are not limited to syndiotactic polystyrene (sPS), poly(4-methyl-1-pentene) (P4MP) and syndiotactic poly(para-methylstyrene) (s-PpMS). Accordingly, in particular embodiments, the selected semi-crystalline polymer described herein comprises a polymer selected from the list consisting of sPS, P4MP, and s-PpMS.

In particular embodiments, the semi-crystalline polymer comprises sPS. Polystyrene may be represented by formula (I)

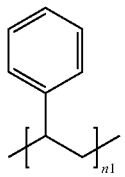

(I)

wherein $n_1$ denotes the degree of polymerization. The phenyl group is pendant to the polymer backbone. In syndiotactic polystyrene, the phenyl groups which are pendent from the polymer backbone alternate with respect to which side of the polymer backbone the phenyl group is pendent. In other words, every other phenyl group is on the same side of the polymer backbone. In contrast, standard polystyrene is referred to as atactic, meaning it has no stereoregularity; the placement of the phenyl groups with respect to each side of the polymer backbone is random, irregular, and follows no pattern. Syndiotactic polystyrene may be prepared by methods well known in the art, for example as described in U.S. Pat. No. 4,680,353.

The term "syndiotactic polystyrene" as used herein includes polystyrene in which syndiotactic stereoregularity predominates. More particularly syndiotactic polystyrene as refers to polystyrene having a stereoregular structure of greater than 50 percent syndiotacticity as determined by $^{13}C$ NMR in terms of a racemic diad. In particular embodiments, the syndiotactic polystyrene has a syndiotacticity of at least 75%, and preferably at least 85%, as determined by $^{13}C$ NMR in terms of a racemic diad. In certain embodiments, the syndiotactic polystyrene has a syndiotacticity of at least 30%, and preferably at least 50%, as determined by $^{13}C$ NMR in terms of a racemic pentad.

With polystyrene herein it is meant a polystyrene comprising at least 50w % of styrene monomers. The polystyrene may comprise up to 50 w % of comonomers. In embodiments wherein the polystyrene is a copolymer, the copolymer preferably is a block copolymer. Suitable comonomers include but are not limited to vinyl, wherein said vinyl may be optionally substituted by one or more aliphatic or aromatic substituents, for example selected from the list consisting of methyl, ethyl, propyl, butyl, and phenyl.

In particular embodiments, the polystyrene comprises at least 75, 80, or 90 w % of styrene monomers. In particular embodiments, the polystyrene is a homopolymer.

In particular embodiments, the semi-crystalline polymer comprises P4MP. P4MP may be represented by formula (II)

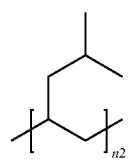

(II)

wherein $n_2$ denotes the degree of polymerization. The isobutyl group is pendant to the polymer backbone. The P4MP polymer may be atactic, tactic or syndiotactic. P4MP may be prepared by methods well known in the art, for example as described by Zambelli et al. (*Macromolecules* 1989, 22, 2126-2128) and Lopez et al. (*J. Macromol. Sci., Polym. Rev.* 1992, 32, 301-406).

With P4MP herein it is meant a P4MP comprising at least 50w % of 4-methyl-1-pentene monomers. The P4MP may comprise up to 50 w % of comonomers. In embodiments wherein the P4MP is a copolymer, the copolymer preferably is a block copolymer. Suitable comonomers include but are not limited to 1-pentene and vinyl, wherein said vinyl may be optionally substituted by one or more aliphatic or aromatic substituents, for example selected from the list consisting of methyl, ethyl, propyl, butyl, and phenyl. In particular embodiments, the P4MP comprises at least 75, 80, or 90 w % of 4-methyl-1-pentene monomers. In particular embodiments, the P4MP is a homopolymer.

In particular embodiments, the semi-crystalline polymer comprises s-PpMS. s-PpMS may be represented by formula (III)

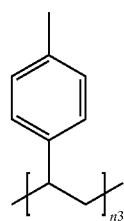

(III)

wherein $n_3$ denotes the degree of polymerization. In syndiotactic PpMS, the p-methylphenyl groups which are pendent from the polymer backbone alternate with respect to which side of the polymer backbone the phenyl group is pendent. In other words, every other p-methylphenyl group is on the same side of the polymer backbone. In contrast, standard PpMS is referred to as atactic, meaning it has no stereoregularity; the placement of the p-methylphenyl groups with respect to each side of the polymer backbone is random, irregular, and follows no pattern. Syndiotactic PpMS may be prepared by methods well known in the art, for example as described by Grassi et al. (*Macromolecules* 1989, 22, 104-108).

The term "syndiotactic PpMS" or "s-PpMS" as used herein includes PpMS in which syndiotactic stereoregularity predominates. More particularly syndiotactic PpMS as refers to PpMS having a stereoregular structure of greater than 50 percent syndiotacticity as determined by $^{13}$C NMR in terms of a racemic diad. In particular embodiments, the syndiotactic PpMS has a syndiotacticity of at least 75%, and preferably at least 85%, as determined by $^{13}$C NMR in terms of a racemic diad. In certain embodiments, the syndiotactic PpMS has a syndiotacticity of at least 30%, and preferably at least 50%, as determined by $^{13}$C NMR in terms of a racemic pentad.

With PpMS herein it is meant a PpMS comprising at least 50w % of p-methylstyrene monomers. In embodiments wherein the PpMS is a copolymer, the copolymer preferably is a block copolymer. The PpMS may comprise up to 50 w % of comonomers. Suitable comonomers include but are not limited to vinyl, wherein said vinyl may be optionally substituted by one or more aliphatic or aromatic substituents, for example selected from the list consisting of methyl, ethyl, propyl, butyl, and phenyl.

In particular embodiments, the PpMS comprises at least 75, 80, or 90 w % of p-methylstyrene monomers. In particular embodiments, the PpMS is a homopolymer.

The end groups of the backbone chain of the polymer, for example the polymers represented by formula (I) or (II), may depend on the kinds of monomers used for synthesis and on the kind of polymerization. In particular embodiments, the end groups are selected from hydrogen and halo (Cl, Br, F, or I).

The selected semi-crystalline polymer(s) may optionally contain small amounts of inert compounds, inhibitors, stabilizers, or other additives which do not significantly affect the crystallinity and density of the crystalline and amorphous phases of the polymer. Preferably the presence of these minor impurities in the polymer(s) is less than 10 weight percent, more preferably less than 5 weight percent, and most preferably less than 1 weight percent.

In particular embodiments, the one or more semi-crystalline polymer(s) have an average molecular weight of at least 10,000 g/mol. In preferred embodiments, the average weight of the semi-crystalline polymer(s) is between 10,000 g/mol and 500,000 g/mol.

Step ii) of the method described herein comprises manufacturing the 3D object from a powder by selective sintering, wherein said powder comprises the semi-crystalline polymer(s) selected in step i).

Methods for manufacturing an object from a powder by selective sintering are well known in the art. Generally these methods allow the layer-by-layer fabrication of 3D objects directly starting from computer generated CAD files. The objects are typically digitally divided into a stack of successive layers that represents the 3D object as closely as possible. The object itself is then manufactured according to the computer generated layers in a selective sintering device. Exemplary devices for performing selective sintering are described in documents EP 2 272 899, EP 1 787 789, and DE 10 2007 024 469.

In the selective sintering device, first a layer of powder is deposited over a manufacturing area (e.g. the bottom of a container which is open at the top). The powder deposited onto the manufacturing area is also referred to as "powder bed". Then, the sections of the powder layer that are part of the object to be constructed are typically irradiated with electromagnetic radiation, thereby causing heating and (partial) melting of the particles. After irradiation, the (partially or completely) molten polymer cools down, resulting in sintering, i.e. coalescing and solidification of the powder in the irradiated areas. Upon completion of this layer a new layer of powder is deposited and the process is repeated until the object is completely finished. In particular embodiments, new layers may be added before (complete) solidification of the molten polymer in the previous layer(s). Then the solidified object can be removed from the unsintered powder and may optionally be processed further. Thus, in particular embodiments, successive layers of the object to be formed from the powder are subsequently solidified at positions corresponding to the cross section of the object. In particular embodiments, the method described herein comprising the steps of:

A) depositing a layer of the powder over a manufacturing area;
B) (temporarily) exposing at least part of said manufacturing area to electromagnetic radiation at positions corresponding to the cross section of the object based on a computer-generated CAD file of the object, thereby forming a lamina of said object; and
C) successively repeating steps a) and b) until the object has been manufactured.

In particular embodiments, the electromagnetic radiation is provided by a laser. Selective sintering using a laser is also known as selective laser sintering (SLS). In certain embodiments, the laser is a high power laser, such as a carbon dioxide laser. However, it is also envisaged that the electromagnetic radiation may be provided by other sources. For example, instead of using a laser, other systems to selectively deliver electromagnetic radiation could be used, such as, e.g., mask exposure systems or the like.

In particular embodiments, the temperature of the powder bed is kept below but close to the melting point of the semi-crystalline polymer contained in the powder. This may reduce the energy gap to be bridged with the electromagnetic radiation energy, and may enhance the connection between successive layers. In certain embodiments, the temperature of the powder is not lower than 20° C. below the melting point of the polymer contained in the powder. In certain embodiments, the temperature of the powder bed is at least 5° C. above the glass transition temperature of the polymer, but below the melting point. The initial cooling rate of the powder immediately after laser irradiation typically depends on the difference between the melting point of the powder and the powder bed, and may for example range between 5 and 25 ° C. per minute. Further cooling of the (solidified) powder may occur more slowly, e.g. at a rate of 0.5 to 2 ° C. per hour.

In particular embodiments, the powder comprises one or more semi-crystalline polymers selected from the list consisting of sPS, P4MP, and s-PpMS.

In particular embodiments, the powder used in the methods described herein may comprise other materials in addition to the semi-crystalline polymer(s). In particular embodiments, the other materials comprise one or more materials selected from the list consisting of glass, a metal, and a ceramic. In certain embodiments, these additional materials may provide an improved stiffness to the object. In preferred embodiments, the powder comprises at least 30 w % of one or more semi-crystalline polymers as described herein. In particular embodiments, the powder comprises at least 40, 50, 60, 70, 80, or 90 w % of one or more semi-crystalline polymers as described herein.

In particular embodiments, the powder is a blend, i.e. a mixture of two or more types of particles. In certain embodiments, the powder may comprise particles comprising one or more semi-crystalline polymers as described herein, in admixture with particles comprising one or more materials selected from the list consisting of glass, a metal (such as steel, aluminum, titanium, etc.), and a ceramic. Preferably, the particles comprising the semi-crystalline polymer(s) have a lower melting point than the other particles in the blend.

In certain embodiments, the powder is a composite powder, i.e. a powder comprising particles which consist of two or more distinct materials joined together. In certain embodiments, the composite powder may comprise coated particles. Typically, the outer coating of the particles comprises one or more semi-crystalline polymers as described herein. In certain embodiments, the particle core may comprise one or more material selected from glass, a ceramic, and a metal (such as steel, aluminum, titanium, etc.). The material forming the core typically has a higher melting point than the semi-crystalline polymer(s). The electromagnetic radiation used in the selective sintering process then typically melts only the outer surface of the particles, fusing the solid non-melted cores to each other and to the previous layer.

It is also envisaged that in particular embodiments, the powder is not a blend, and not a composite powder. In particular embodiments, the powder may be a single-component powder, wherein the single component is or comprises a semi-crystalline polymer as described herein.

The particles contained in the powder used in the method described herein typically have an average size ranging between 10 and 200 µm, preferably between 20 and 100 µm. The dimensions of the particles are typically equal to or lower than the thickness of the individual powder layers in the powder bed. In particular embodiments, at least 50% of the particles have a size below 60 µm. In certain embodiments, at least 60% of the particles have a size below 90 µm. The particle size can be determined via laser diffraction, or via microscopy methods such as Scanning Electron Microscopy or Transmission Electron Microscopy.

Further provided herein is a 3D object obtainable by the method described herein. In particular embodiments, provided herein is a 3D object obtained by selective sintering of a powder, wherein said object comprises at least 10 w % of one or more semi-crystalline polymer wherein the density of said polymer(s) the crystalline phase is lower than the density of the amorphous phase. In further embodiments, the object comprises at least 20, 30, 40, 50 w % or more of said polymer(s). In particular embodiments, the object comprises between 10 and 70 w % of said polymer(s). In particular embodiments, said polymer is selected from the list consisting of sPS, P4MP and s-PpMS.

The final degree of crystallinity of the semi-crystalline polymer comprised by the object may differ from the initial degree of crystallinity of the polymer powder prior to manufacturing of said object. The final degree of crystallinity may be lower or higher than the initial degree of crystallinity.

Thus also provided herein is the use of a powder in the manufacture of a 3D object by means of selective sintering, wherein said powder comprises at least 30 w %, preferably at least 50 w %, of one or more semi-crystalline polymers wherein the density of the crystalline phase of said polymer(s) is equal to or lower than the density of the amorphous phase. In particular embodiments, said one or more polymers are selected from the list consisting of sPS, P4MP and s-PpMS.

Further provided herein are methods for manufacturing an object from a powder by selective sintering, characterized in that said powder comprises a semi-crystalline polymer wherein the density of the crystalline phase is lower than the density of the amorphous phase.

The invention claimed is:

1. A method for manufacturing an object by selective sintering of a powder, said method comprising:
selecting at least one semi-crystalline polymer, wherein a density of a crystalline phase of said at least one semi-crystalline polymer is equal to or lower than a density of an amorphous phase of said at least one semi-crystalline polymer upon crystallization; and
manufacturing said object from a powder by selective sintering, wherein said powder comprises said at least one semi-crystalline polymer.

2. The method according to claim 1, wherein the selective sintering is at least one of selective laser sintering or an additive manufacturing process.

3. The method according to claim 2, wherein a change in density upon crystallization of said at least one semi-crystalline polymer compensates for at least part of a change in specific volume or density of said at least one semi-crystalline polymer upon cooling.

4. The method according to claim 2, wherein selecting the at least one semi-crystalline polymer comprises:
identifying a change in specific volume or density of one or more polymers upon crystallization; and
selecting the at least one semi-crystalline polymer from the one or more polymers based on the identifying the change in specific volume or density.

5. The method according to claim 2, wherein said at least one semi-crystalline polymer is a polymer selected from a list consisting of syndiotactic polystyrene, poly(4-methyl-1-pentene), and syndiotactic poly(p-methylstyrene).

6. The method according to claim 2, wherein said powder comprises at least 30 w % of said at least one semi-crystalline polymer.

7. The method according to claim 2, wherein a degree of crystallinity of said at least one semi-crystalline polymer is between 50 and 80%.

8. The method according to claim 2, wherein said powder is a composite powder.

9. The method of claim 2, wherein the density of the crystalline phase is lower than the density of the amorphous phase of the at least one semi-crystalline polymer.

10. The method according to claim 9, wherein said at least one semi-crystalline polymer is a polymer selected from a list consisting of syndiotactic polystyrene, poly(4-methyl-1-pentene), and syndiotactic poly(p-methylstyrene).

11. The method according to claim 9, wherein said powder comprises at least 30 w % of said at least one semi-crystalline polymer.

12. The method according to claim 9, wherein a degree of crystallinity of said at least one semi-crystalline polymer is between 50 and 80%.

13. The use of a powder in the manufacture of a 3D object by means of selective sintering of said powder, wherein at least 30 w % of said powder is a semi-crystalline polymer wherein a density of a crystalline phase is lower than a density of an amorphous phase of the semi-crystalline polymer.

14. The use according to claim 13, wherein the means of selective sintering is at least one of selective laser sintering or an additive manufacturing process.

15. The use according to claim 14, wherein said semi-crystalline polymer comprises a polymer selected from a list consisting of syndiotactic polystyrene, poly(4-methyl-1-pentene), and syndiotactic poly(p-methylstyrene).

* * * * *